(12) United States Patent
Wang

(10) Patent No.: US 6,779,898 B2
(45) Date of Patent: Aug. 24, 2004

(54) IMAGE DISPLAY APPARATUS AND METHOD FOR RECAPTURING OFF-STATE LIGHT

(75) Inventor: Chih-Yuan Wang, Taoyuan (TW)

(73) Assignee: Benq Corporation, Taoyuan (TW)

(*) Notice: Subject to any disclaimer, the term of this patent is extended or adjusted under 35 U.S.C. 154(b) by 0 days.

(21) Appl. No.: 10/408,034

(22) Filed: Apr. 4, 2003

(65) Prior Publication Data

US 2003/0189748 A1 Oct. 9, 2003

(30) Foreign Application Priority Data

Apr. 9, 2002 (TW) .......................... 91107046 A

(51) Int. Cl.⁷ .......................... G03B 21/28; G02B 26/08
(52) U.S. Cl. .......................... 353/99; 353/122; 359/223
(58) Field of Search .......................... 353/34, 37, 122, 353/20, 31, 77–8, 98–9; 348/744, 758, 771; 359/223, 224

(56) References Cited

U.S. PATENT DOCUMENTS

| | | | | |
|---|---|---|---|---|
| 5,633,755 A | * | 5/1997 | Manabe et al. | 359/443 |
| 6,309,074 B1 | * | 10/2001 | Inbar et al. | 353/120 |
| 6,454,417 B1 | * | 9/2002 | Takamoto et al. | 353/33 |
| 6,474,818 B1 | * | 11/2002 | Engle | 353/84 |
| 6,601,959 B2 | * | 8/2003 | Miyata et al. | 353/98 |
| 6,739,723 B1 | * | 5/2004 | Haven et al. | 353/20 |

* cited by examiner

Primary Examiner—Christopher Mahoney
(74) Attorney, Agent, or Firm—Snell & Wilmer L.L.P.

(57) ABSTRACT

An image display apparatus and a method for recapturing off-state light are provided. The image display apparatus includes a spatial light modulator, a reflector, and an integrator element. The spatial light modulator, in response to a light beam, selectively modulates the light beam along a first path to form a first path light beam. The reflector reflects the first path light beam to form a reflected light beam. The integrator element collects and reflects the reflected light beam to form a recapture light beam. Further, the spatial light modulator modulates the recapture light beam along a second path to form an image on a screen.

14 Claims, 5 Drawing Sheets

IMAGE DISPLAY APPARATUS AND METHOD FOR RECAPTURING OFF-STATE LIGHT

CROSS REFERENCE TO RELATED APPLICATIONS

This application claims priority to Taiwan Patent Application No. 091107046 entitled "Image Display Apparatus and Method for Recapturing Off-State Light", filed Apr. 9, 2002.

FIELD OF INVENTION

The present invention generally relates to an image display apparatus and a method for enhancing image brightness, and more particularly, to an image display apparatus and a method for recapturing off-state light to enhance image brightness.

BACKGROUND OF THE INVENTION

In parallel with the progress of business activities and the development of interactive learning, projectors become indispensable image forming apparatuses in many kinds of business events. Therefore, the image displaying technology is advancing from the liquid crystal display to the digital light processing (DLP).

The digital light processing technology employs the reflected light, which is modulated by the spatial light modulator (SLM), such as commonly known digital micromirror device (DMD). The DMD has an array of micromirrors. By controlling the tilt angle of each micromirror individually, every micromirror can be selectively arranged in two states, such as "on" state and "off" state. Referring to FIG. 1, a block diagram of a conventional image display apparatus is illustrated. When the light beam provided by the light source 10 travels through integrator 20 and filter 30 and impinges on the DMD 40, according to image signals, the controller 70 determines the corresponding state of each micromirror. When the image signal is on, the corresponding micromirror is in the on state and the light beam is reflected to form an image on screen 50. When the image signal is off, the corresponding micromirror is in the off state and the light beam is reflected to other direction and absorbed by absorber 60 or converted to heat.

Brightness, resolution, weight, light source lifetime are indices for determining the quality of a projector. The brightness indicating the intensity of light projected on a screen determines whether a projector can have an effective image even in a bright environment. If the brightness achieves some level, the projector can have a projected image of good quality without the need of darkening the environment or turning off the facility light.

Light source is a component directly relating to the brightness of projectors. In general, the projector displays image of higher brightness as the light source has larger power (or wattage). However, purely increasing power of the light source to improve the brightness cannot improve the total quality of a projector because, for example, a light source of higher power generates more heat, which requires a better heat dissipation mechanism, such as a larger fan. When the fan becomes larger, the noise becomes louder and the size of the projector increases at the same time. Therefore, increasing the power of light source to improve the brightness must sacrifice other aspects of quality.

Therefore, there is a need to provide an image display apparatus and a method for improving the brightness of the apparatus without inducing more heat problems.

OBJECTS AND SUMMARY OF THE INVENTION

One aspect of the present invention is to provide an image display apparatus, which recaptures off-state light to enhance image brightness. When a spatial light modulator is in the off state, a reflector is implemented to reflect the off-state light, which is then collected and recycled. When the spatial light modulator is in the on state, the collected off-state light is modulated to enhance the brightness of image on a screen.

In a first exemplary embodiment of the present invention, the image display apparatus includes a spatial light modulator, a reflector, and an integrator element. The spatial light modulator, in response to a light beam, selectively modulates the light beam along a first path to form a first path light beam. The reflector reflects the first path light beam to form a reflected light beam. The integrator element collects and reflects the reflected light beam to form a recapture light beam. Further, the spatial light modulator modulates the recapture light beam along a second path to form an image on a screen.

In a second exemplary embodiment of the present invention, an image display apparatus including a light source, an integrator element, a spatial light modulator, and a reflector is provided. The light source provides a light beam, which enters the integrator element at a first end and exits from a second end. The spatial light modulator selectively modulates the light beam along a first path to form a first path light beam. The reflector reflects the first path light beam to form a reflected light beam. The reflected light beam modulated by the spatial light modulator enters the integrator element at the second end along a reverse path. The integrator element collects and reflects the reflected light beam to form a recapture light beam, so that the spatial light modulator modulates the recapture light beam along a second path to form an image on a screen.

The present invention also provides a method for recapturing off-state light. The method includes the step of providing a light beam, which is then selectively modulated along a first path by a spatial light modulator to form a first path light beam. The first path light beam is reflected to form a recapture light beam, which is then modulated along a second path by the spatial light modulator to form an image on a screen.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

Figure 2:
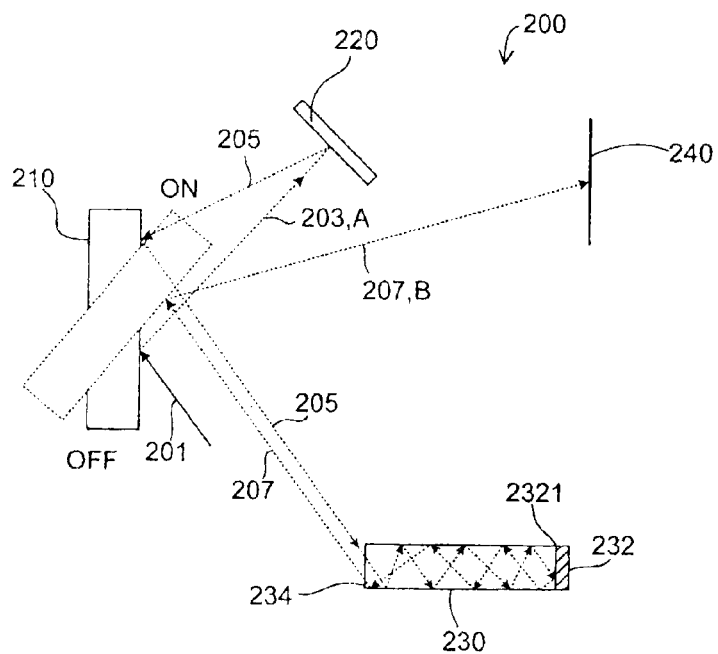
FIG. 2 illustrates a first exemplary image display apparatus.

Referring to FIG. 2, in a first exemplary embodiment, the present invention provides an image display apparatus 200, which includes a spatial light modulator 210, a reflector 220, and an integrator element 230. The spatial light modulator 210 can be a digital micromirror device (DMD), which is configured to have two states, such as "on" and "off" states, by adjusting the deflection angle of a micromirror to selectively reflect an incident light to two different paths. In the "off" state, the spatial light modulator 210 reflects an incident light beam 201 along a first path, A, to form a first path light beam 203.

The reflector 220 is configured to reflect the first path light beam 203 to form a reflected light beam 205. The reflector 220 can be a flat mirror, a spherical mirror, or an aspheric mirror according to the design requirement.

The integrator element 230 is configured to collect and reflect the reflected light beam 205 to form a recapture light beam 207. One exemplary integrator element 230 is a light pipe, which has a first end 232 and a second end 234. The first end 232 of the integrator element 230 includes a reflecting surface 2321 with an aperture. Moreover, the internal surface of the integrator element 230 is also a reflecting surface. The reflected light 205 enters the integrator element 230 at the second end 234 and is continuously reflected by the internal surface to reach the first end 232. The reflected light 205 is then reflected by the reflecting surface 2321 and the internal surface until it reaches the second end 234 and exits the integrator element 230 from the second end 234 to form the recapture light beam 207. It is noted that the reflected light beam 205 can also be modulated by the spatial light modulator 210 to enter the integrator element 230 at the second end 234. Then, the reflected light beam 205 is reflected by the reflecting surface 2321 to exit the integrator element 230 from the second end 234 to form the recapture light beam 207, as shown in FIG. 2. When the spatial light modulator 210 is in the "on" state, the recapture light beam 207 is modulated along a second path, B, to form an image on a screen 240.

Figure 3A:
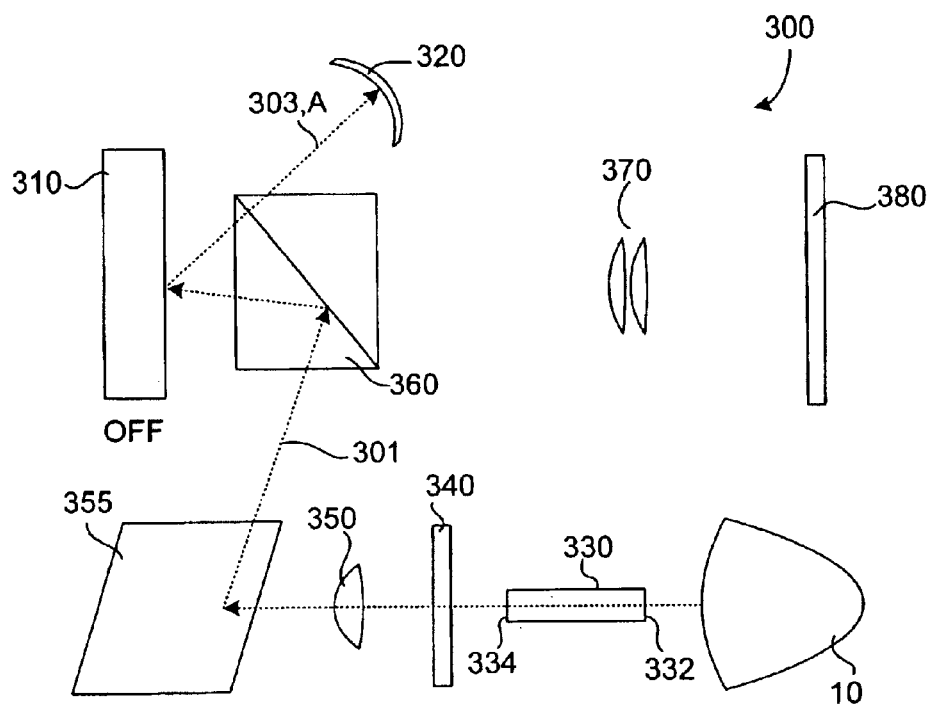
FIG. 3A illustrates a light path in a second exemplary image display apparatus when a spatial light modulator is in the off state.

Referring to FIG. 3A, in a second exemplary embodiment of the present invention, an image display apparatus 300 includes a light source 10, a spatial light modulator 310, a reflector 320, and an integrator element 330. The image display apparatus 300 further includes other optical devices, such as a filter 340, a focus device 350, a reflective mirror 355, a total internal reflector 360, and optical lenses 370 along the light traveling path.

The exemplary integrator element 330 is a light pipe having a first end 332 and a second end 334. The first end 332 of the light pipe 330 includes an aperture 3321 and a reflecting surface 3322, as shown in FIG. 3D. The light pipe 330 has an internal reflecting surface, so that the light is reflected to travel in the light pipe 330 from one end to the other end. The light source 10 provides a light beam 301, which enters the light pipe 330 through the aperture 3321 of the first end 332 and exits from the second end 334. In a color display system, the filter 340 is generally disposed at the second end 334 of the light pipe 330 for filtering the light beam 301 exiting the light pipe 330. The light beam 301 is selectively filtered to become one of primary colors, such as red, green, and blue. Then, the filtered light beam is focused and reflected by the focus device 350, the reflective mirror 355, and the total internal prism 360, respectively, to the spatial light modulator 310.

The spatial light modulator 310 can be the DMD as described in the first embodiment, which is configured to have two states, such as "on" and "off" states, by adjusting the deflection angle of a micromirror to selectively reflect an incident light to two different paths. In the "off" state, the spatial light modulator 310 reflects the light 301 exiting from the second end 324 along a first path A to form a first path light beam 303, as shown in FIG. 3A.

Figure 3B:
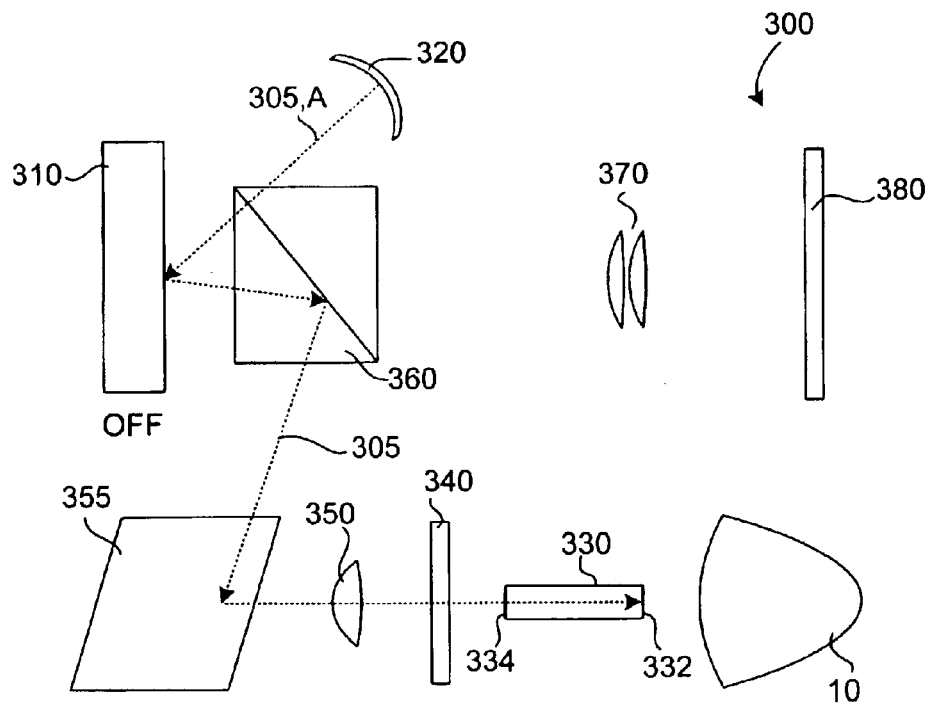
FIG. 3B illustrates a light path of a reflected light in the second exemplary image display apparatus.

Referring to FIG. 3B, the exemplary reflector 320 is a spherical mirror, which is disposed on the first path, configured to reflect the first path light 303 to form a reflective light 30. It is noted that the reflector 320 can be a flat mirror or an aspheric mirror according to the design requirement. By adjusting a reflective angle of the reflector 320, the reflective light 305, which is reflected along a reverse path via the spatial light modulator 310, the total internal reflector 360, the reflective mirror 355, the focus device 350, and the filter 340, enters the integrator element 330 at the second end 334. Then, the reflected light 305 is continuously reflected by the internal surface of the integrator element 330 until it reaches the first end 332.

Figure 3C:
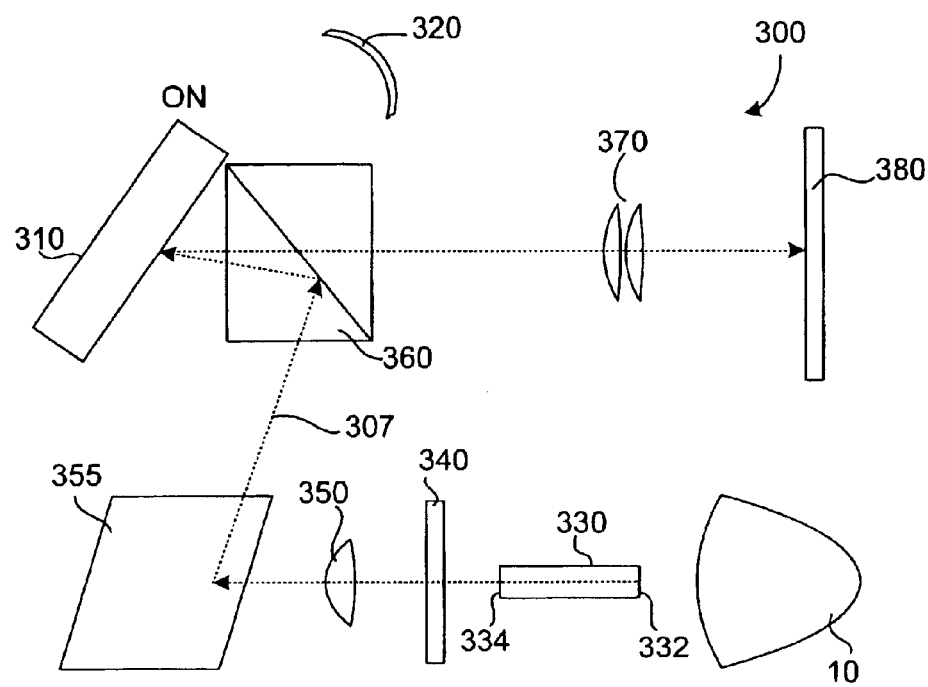
FIG. 3C illustrates a light path of a recapture light in the second exemplary image display apparatus when the spatial light modulator is in the on state.
Figure 3D:
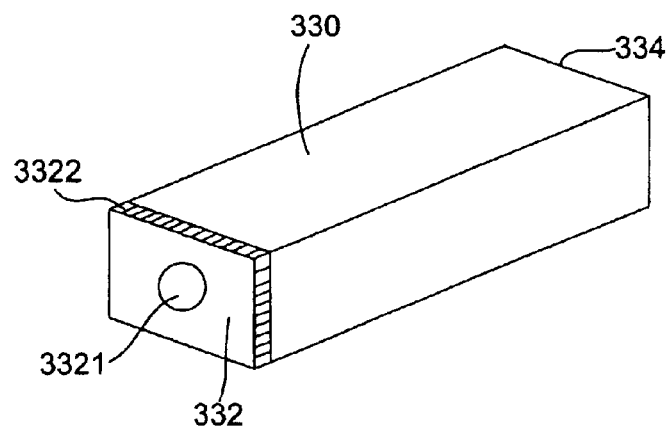
FIG. 3D illustrates an exemplary embodiment of an integrator element.

Referring to FIG. 3C, the integrator element 330 is configured to collect and reflect the reflected light 305, which is continuously reflected by the internal reflecting surface until reaching and exiting the send end 334 to form a recapture light beam 307. When the spatial light modulator 310 is in the "on" state, the recapture light beam 307, which travels through filter 340, focus device 350, reflective mirror 355, and total internal reflector 360 to the spatial light modulator 310, is modulated along a second path B to form an image on a screen 370.

Figure 1:
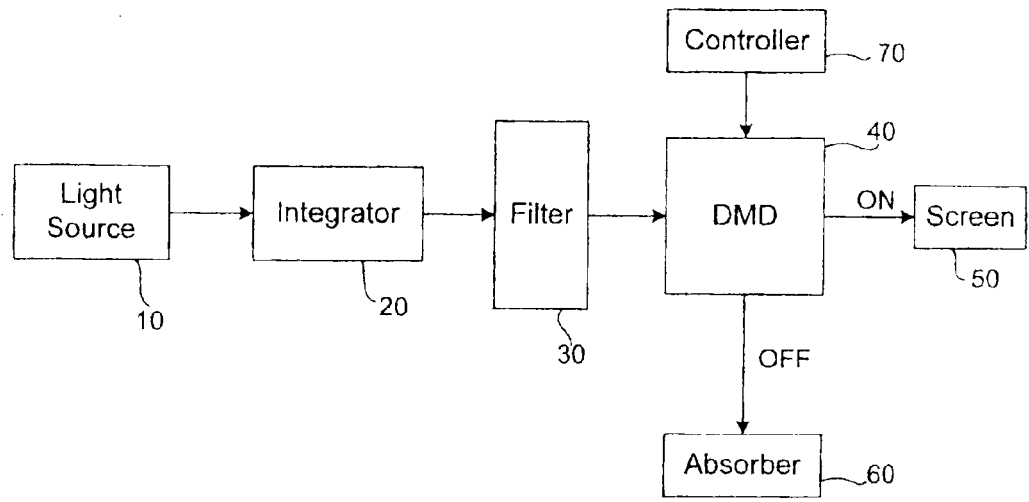
FIG. 1 illustrates a block diagram of a conventional image display apparatus.
Figure 4:
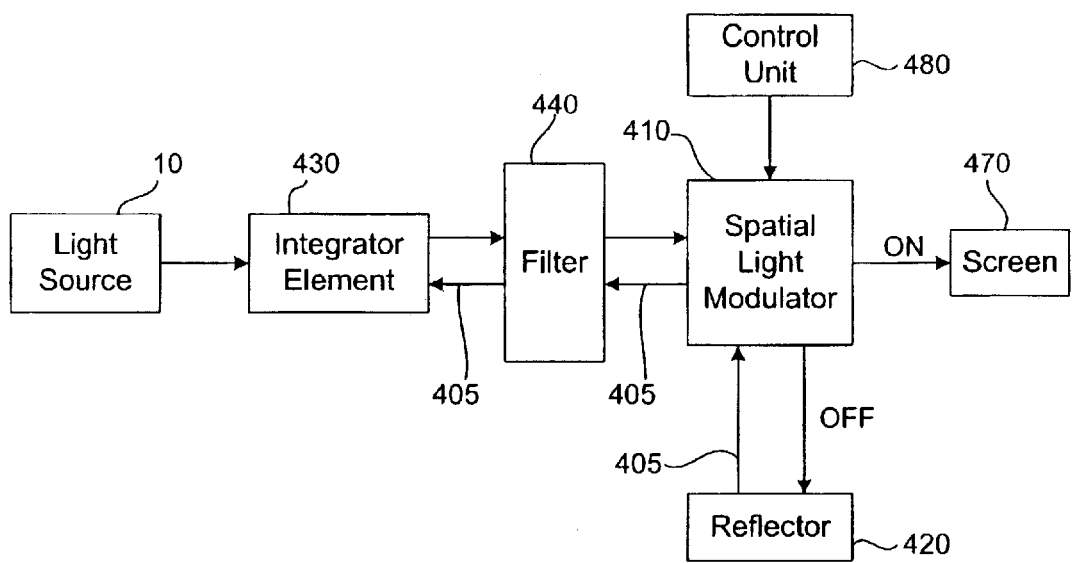
FIG. 4 illustrates a block diagram of an exemplary image display apparatus of the present invention.

FIG. 4 illustrates a block diagram of an exemplary image display apparatus, which shows the difference between the present invention and prior art shown in FIG. 1. When the light beam generated by the light source 10 travels through an integrator element 430, a filter 440 to impinge on the spatial light modulator 410, the control unit 480 controls the "on-off" state of the spatial light modulator 410 in response to an image signal. When the corresponding micro-mirror of the spatial light modulator 410 is in the "off" state, by using a reflector 420, the "off-state" light is reflected along a reverse path 405 to the integrator element 430 and collected. When the corresponding micro-mirror of the spatial light modulator 410 is in the "on" state, the collected "off-state" light is modulated to form an image on a screen 470 resulting in an increase of image brightness.

Figure 5:
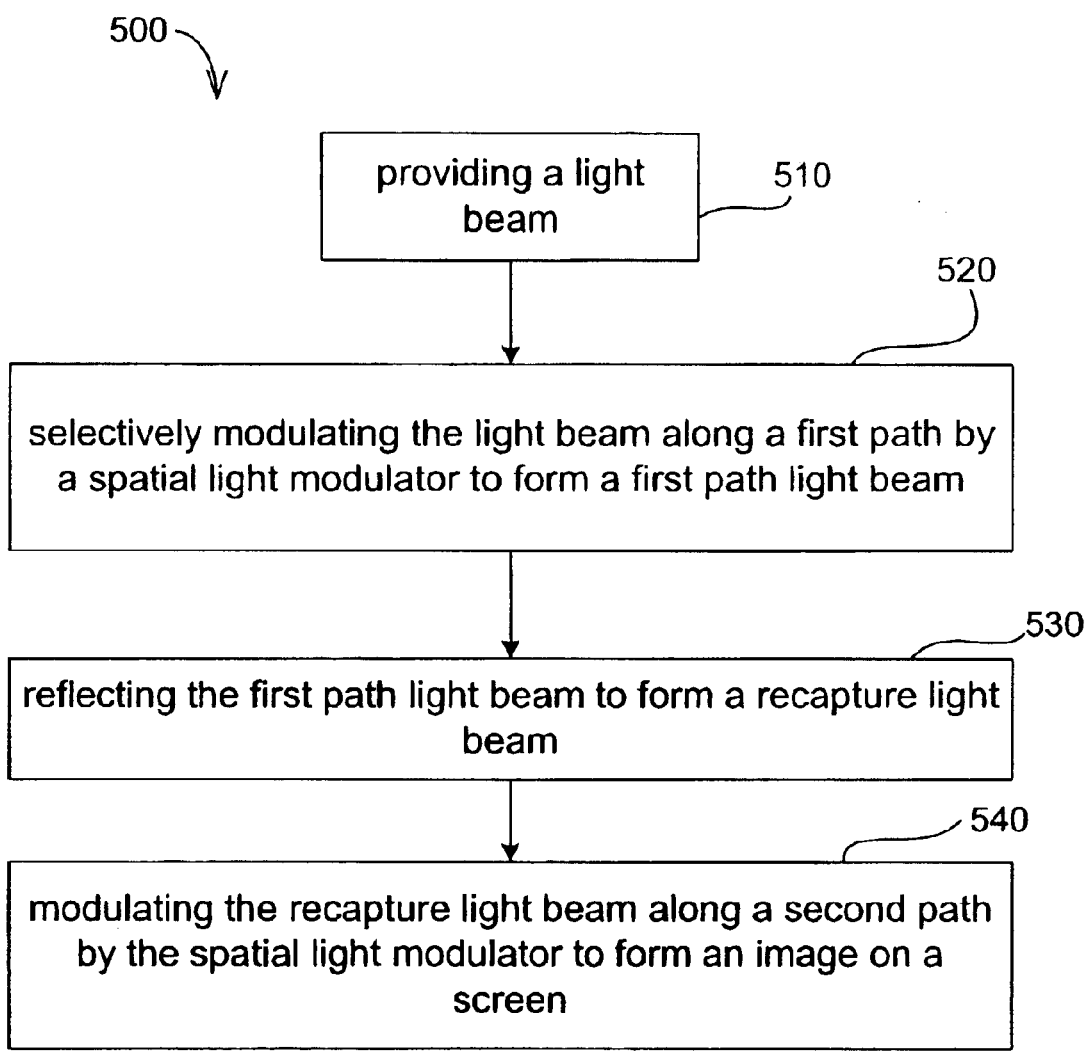
FIG. 5 illustrates a flow diagram of recapturing off-state light in another embodiment of the present invention.

The present invention also provides a method for recapturing an "off-state" light to form an image. The method as illustrated in flow diagram 500 of FIG. 5 includes steps 510, 520, 530, and 540. In step 510, a light beam is provided. Then, the light beam is selectively modulated along a first path by a spatial light modulator to form a first path light beam in step 520. The first path light beam is reflected to form a recapture light beam in step 530. The recapture light beam is modulated along a second path by the spatial light modulator to form an image on a screen in step 540.

The method further includes a step of filtering the light beam to form a filtered light beam prior to the selective modulation of light beam. Then, the filtered light beam is focused to form a focused light beam, which is reflected to the spatial light modulator. Furthermore, when the spatial light modulator is in the "on" state, the light beam traveling along the second path is focused and then forms the image on the screen.

The advantage of the present invention includes the recapture of "off-state" light to improve image brightness and the reduction of heat converted by the "off-state" light compared to the prior art. It is noted that when implementing the image display apparatus 200 or 300 or the image display method 500, during the formation of a static or a dynamic image, adjusting the gray level arrangement of the spatial light modulator can optimize the image displaying effect.

Although specific embodiments have been illustrated and described, it will be apparent that various modifications may be made without departing from what is intended to be limited solely by the appended claims.

What is claimed is:

1. An image display apparatus, comprising:
   a spatial light modulator, in response to a light beam, configured to selectively modulate said light beam along a first path to form a first path light beam;
   a reflector configured to reflect said first path light beam to form a reflected light beam; and
   an integrator element having a first end and a second end, wherein said reflected light beam travels alone a reverse path modulated by said spatial light modulator entering said integrator element at said second end, and said integrator element collects and reflects said reflected light beam to form a recapture light beam exiting said integrator element from said second end;
   wherein said spatial light modulator modulates said recapture light beam along a second path to form an image on a screen.

2. The image display apparatus of claim 1 further comprising a light source for providing said light beam, wherein said light beam enters said integrator element at said first end and exits from said second end before modulated.

3. The image display apparatus of claim 2, wherein said first end of said integrator element comprises an aperture and a reflecting surface, and wherein said light beam enters said integrator element through said aperture, and said reflecting surface reflects said reflected light beam to form said recapture light beam.

4. The image display apparatus of claim 2, wherein said integrator element comprises a light pipe.

5. The image display apparatus of claim 2 further comprising a filter, disposed on the exit of said second end, configured to filter light beams exiting said integrator element from said second end.

6. The image display apparatus of claim 1 further comprising a focus device configured to focus said light beam before modulated by said spatial light modulator.

7. The image display apparatus of claim 1 further comprising a total internal reflection prism, wherein said light beam travels through said total internal reflection prism before modulated by said spatial light modulator.

8. The image display apparatus of claim 1 further comprising an optical lens, wherein said recaptured light beam travels along said second path through said optical lens to form said image on said screen.

9. The image display apparatus of claim 1, wherein said spatial light modulator comprises a micromirror.

10. The image display apparatus of claim 1, wherein said reflector comprises a flat mirror.

11. The image display apparatus of claim 1, wherein said reflector comprises a spherical mirror.

12. A method for displaying image with recapture of off-state light, comprising:
    providing a light beam;
    selectively modulating said light beam along a first path by a spatial light modulator to form a first path light beam;
    reflecting said first path light beam along a reverse path modulated by said spatial light modulator to form a recapture light beam; and
    modulating said recapture light beam along a second path by said spatial light modulator to form an image on a screen.

13. The method of claim 12 further comprising steps of filtering and focusing said light beam before selectively modulating said light beam.

14. The method of claim 12 further comprising a step of focusing light beams traveling along said second path before forming said image on said screen.

* * * * *